May 20, 1958     P. L. GOMEZ     2,835,070
RODENT TRAP
Filed Feb. 3, 1955
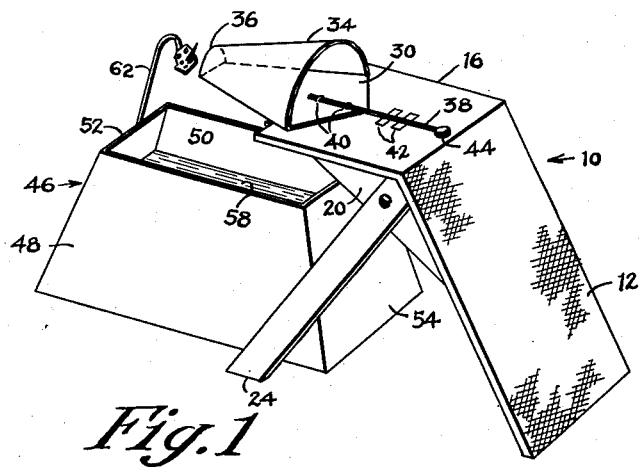
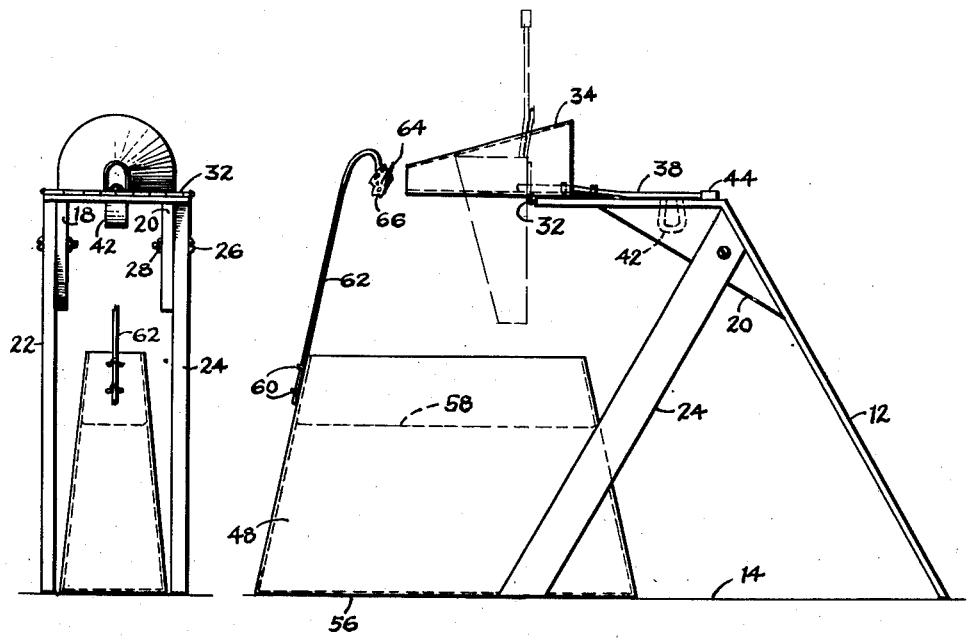
INVENTOR
PEDRO L. GOMEZ
BY *Kimmel & Crowell*
ATTORNEYS

United States Patent Office 2,835,070
Patented May 20, 1958

2,835,070

RODENT TRAP

Pedro L. Gomez, Bronx, N. Y.

Application February 3, 1955, Serial No. 485,953

1 Claim. (Cl. 43—69)

This invention relates to animal traps, and more specifically to a new and improved rodent trap.

One of the primary objects of this invention is to provide a counter-balanced trap which is thrown out of balance by the weight of the rodent to effect the trapping action of the device.

Another object of this invention is to provide a counter-balanced trap which automatically resets itself after each actuation thereof.

A further object of this invention is to provide a magnetically controlled trap which is counter-balanced, and wherein the trap is held in its inoperative position until the rodent has passed a point on the trap whereby its weight exerts a sufficient force to break the control.

A still further object of this invention is to provide a rodent trap which is inexpensive to manufacture and maintain, non-complex in construction and assembly, and durable in use.

Other and further objects and advantages of the present invention will become more evident from a consideration of the following specification when read in conjunction with the annexed drawing, in which:

Figure 1 is a perspective view of an animal trap constructed in accordance with the present invention.

Fig. 2 is a side elevational view of the trap shown in Figure 1.

Figure 3 is an end elevational view, partially broken away, of the trap illustrated in Figures 1 and 2.

Referring now more specifically to the drawing, reference numeral 10 designates, in general, an animal trap constructed in accordance with the teachings of the present invention. The trap may be made of any inexpensive material such as pasteboard, plywood, wood and other similar materials.

As illustrated in the drawing, the trap 10 is seen to comprise an elongated substantially rectangular ramp 12 having an anti-skid surface and which is inclined at an angle to a supporting surface 14. The upper end of the ramp 12 is provided with a substantially rectangular platform 16 which extends substantially parallel to the supporting surface 14.

A pair of triangularly shaped braces 18, 20 are disposed at the corner formed at the junction of the ramp 12 with the platform 16 and are positioned adjacent opposite sides of the trap. The braces 18, 20 are secured to the ramp by any conventional means, for example, by nails or any suitable adhesive. A pair of legs 22, 24 have one of their ends secured to the brace members 18, 20, respectively, by bolts 26 and nuts 28.

A tongue 30 is pivotally secured at 32 to the outer end of the platform 16, the tongue 30 having a substantially pentagonal configuration. The tongue 30 has integrally formed therewith or otherwise secured thereto a semi-frusto-conical member 34 with the reduced end portion 36 thereof extending laterally away from the platform 16.

An elongated rod 38 formed of ferrous material is secured to the tongue 30 by means of brackets 40. As is seen in the drawing, the rod 38 extends centrally of the platform 16 and forms a keeper for a permanent magnet 42 which is supported by the platform 16 by any conventional means, and has the poles thereof substantially flush with the upper surface of the platform 16. The extreme outer end of the rod 38 is provided with a weight 44 which serves a function to be described.

Immediately below the reduced end 36 of the semi-frusto-conical member 34 is disposed a receptacle 46 having upwardly converging side walls 48, 50, and end walls 52, 54. The side and end walls arise from a common bottom wall 56. The container or receptacle 46 is filled with a liquid such as water 58 to a desired height.

A pair of brackets 60 secure one end of an elongated rod 62 to the end wall 52 of the receptacle 46, and the other or upper end of the rod 62 is bent to form a hook portion 64 which is disposed adjacent the reduced end 36 of the semi-frusto-conical member 34. The hook 64 is adapted to support any desirable bait designated at 66.

In operation, and assuming that a rodent has climbed the ramp 12 and has passed over the platform 16 and onto the tongue 30, the trap will not be sprung until the rodent has passed beyond the hinge point 32 a sufficient distance to overcome the force of the magnet 42 which is exerted on the rod 38 and over-balances the weight of the weight 44. At this point, the tongue 30 and its associated semi-frusto-conical member 34 pivots downwardly and the rodent slides through the reduced end portion 36 thereof and is deposited in the water 58.

After the trap has been sprung, the weight 44, being off center with respect to the hinge 32, returns the tongue 30 and its semi-frusto-conical member 34 to its original position, and the magnet 42 and weight 44 serve to retain the tongue and its associated member 34 in their respective normal positions to effect a resetting of the trap.

Having described and illustrated one embodiment of this invention in detail, it is to be understood that the same is offered merely by way of example, and that the invention is to be limited only by the scope of the appended claim.

What is claimed is:

An animal trap adapted to be positioned above a pail of liquid comprising a plate positioned to extend partially across the top of the pail, means supporting said plate in horizontally fixed position, a tongue secured to said plate by horizontally extending transverse pivot means, a semi-conical tunnel member secured to said tongue and having a small open end thereof extending beyond the end of said plate and a large open end thereof positioned in overlying relation to said plate, a light wire of ferrous material secured to said tongue and extending out of the large open end of said tunnel, a permanent magnet secured to said plate and engaged by said wire when the tunnel is in a horizontal position to hold the tunnel in this position, the weight of the animal on the end of the tongue adjacent the small open end of said tunnel causing the tongue to break the connection of the wire with the magnet and precipitate the animal into the liquid, and a weight secured on the end of said wire adjacent said magnet to assist in restoring the tunnel to its horizontal position.

References Cited in the file of this patent

UNITED STATES PATENTS

| 100,779 | Lyman | Mar. 15, 1870 |
| 973,583 | Teeter | Oct. 25, 1910 |
| 1,517,192 | Cervenec | Nov. 25, 1924 |
| 1,520,557 | Berg | Dec. 23, 1924 |
| 1,597,551 | Stewart | Aug. 24, 1926 |
| 1,712,115 | Kruzel | May 7, 1929 |
| 1,738,623 | Westerlund | Dec. 10, 1929 |
| 2,092,357 | Reynolds | Sept. 7, 1937 |